United States Patent [19]

Kusumoto et al.

[11] Patent Number: 4,926,993
[45] Date of Patent: May 22, 1990

[54] RELEASE BEARING UNIT

[75] Inventors: Hirotaka Kusumoto; Toshihiko Shiraki, both of Osaka, Japan

[73] Assignee: Koyo Seiko Co., Ltd., Osaka, Japan

[21] Appl. No.: 170,334

[22] Filed: Mar. 18, 1988

[30] Foreign Application Priority Data

Mar. 18, 1987 [JP] Japan .................. 62-64781

[51] Int. Cl.⁵ .................................... F16D 23/14
[52] U.S. Cl. .................... 192/98; 192/110 B
[58] Field of Search .................. 192/98, 110 B

[56] References Cited

U.S. PATENT DOCUMENTS

| | | | |
|---|---|---|---|
| 4,117,916 | 10/1978 | Baker | 192/98 |
| 4,144,957 | 3/1979 | De Cennes | 192/98 |
| 4,186,828 | 2/1980 | Renaud | 192/98 |
| 4,234,067 | 11/1980 | Billet | 192/98 |
| 4,327,951 | 5/1982 | Arrowsmith et al. | 192/98 X |
| 4,351,427 | 9/1982 | Miyahara | 192/98 |
| 4,466,527 | 8/1984 | Billet | 192/98 |
| 4,519,488 | 5/1985 | Renaud | 192/98 |
| 4,529,075 | 7/1985 | Renaud | 192/98 |
| 4,561,788 | 12/1985 | Tanaka | 192/98 X |
| 4,579,211 | 4/1986 | Renaud | 192/98 |
| 4,742,902 | 5/1988 | Leigh-Monstevens | 192/98 |
| 4,750,601 | 6/1988 | Gay et al. | 192/98 |

Primary Examiner—Rodney H. Bonck

[57] ABSTRACT

A release bearing unit comprises a release hub member for coupling a release fork of a clutch and a release bearing member. The release bearing is coupled to the circumference of the release hub member. The release hub member comprises a hub body and a fork receiving member. The hub body is provided with a sleeve made of synthetic resin. The fork receiving member receives the release fork of the clutch.

6 Claims, 6 Drawing Sheets

4,926,993

RELEASE BEARING UNIT

BACKGROUND OF THE INVENTION

The present invention relates to a release bearing unit suitable for a clutch of an automobile.

FIG. 8 shows a conventional release bearing unit by way of example. A release bearing 1 and a release hub 2 are provided. The release hub 2 may generally be a casting made of cast iron or aluminum. The release hub 2 is provided with a cylinder 3 to whose circumference the release bearing 1 is fitted, a fork guide 5 to whose circumference a release fork of the clutch (shown in a dashed line in FIG. 8) is coupled, and a projection 6 receiving operation force from the release fork 4 and supporting a side of the release bearing 1.

As shown in FIG. 9, the fork guide 5 is provided with a pair of parallel flat portions 5a and 5b and portions 5c and 5d. Since the release hub 2 is operated to slide on a retainer made of aluminum alloy, an inner face 7 of the release hub 2 should be finished precisely.

The above-constructed conventional release bearing unit has the following problems. Depending on the type of automobile to be used, the length A of the release hub 2 as shown in FIG. 8 must be altered. Therefore, a plurality of types of release hubs 2 having a different clearance A must be prepared for each of the plurality of types of automobiles. Further, because the structure of the release hub 2 is complex, it is difficult to make it light although a light release hub 2 has been recently desired. In order to reduce abrasion of the retainer made of aluminum alloy and prevent the stepping force of the clutch pedal from becoming abnormal, the inner face 7 of the release hub 2 is fairly precisely finished. However, it is not enough, and the inner face 7 should be greased. It is difficult to have a release bearing unit with these properties.

SUMMARY OF THE INVENTION

Accordingly, it is an object of the present invention to provide an improved, lightweight release bearing unit for improving its sliding property on a retainer and being suitable for general purposes.

It is another object of the present invention to provide an improved release bearing unit comprising a fork receiving member and a common hub body which can be applied for various clutch release arrangements of automobiles.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a release bearing unit comprise release hub means for coupling release fork of a clutch, and release bearing means being coupled to the circumference of the release hub means, the release hub means comprising hub body means containing a sleeve member composed of synthetic resin, and fork receiving means for receiving the release fork of the clutch.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF PREFERRED EMBODIMENTS FIRST PREFERRED EMBODIMENT

Figure 1:
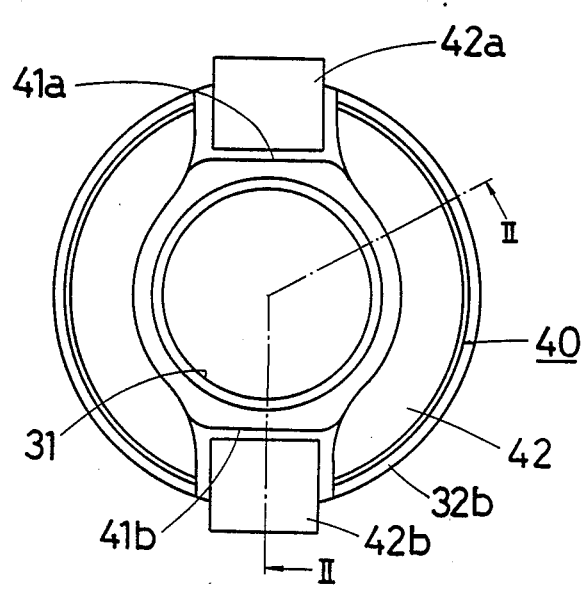
FIG. 1 is a front view of a release bearing unit according to a first preferred embodiment of the present invention.
Figure 2:
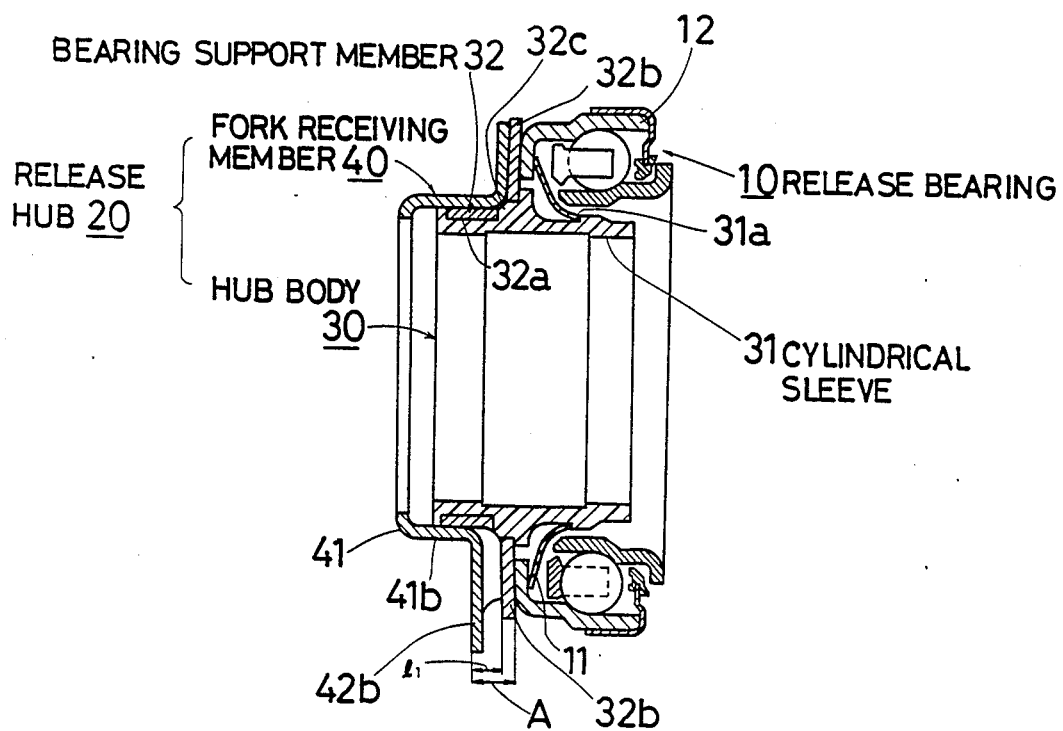
FIG. 2 is a sectional view of FIG. 1 taken along line II—II.
Figure 3:
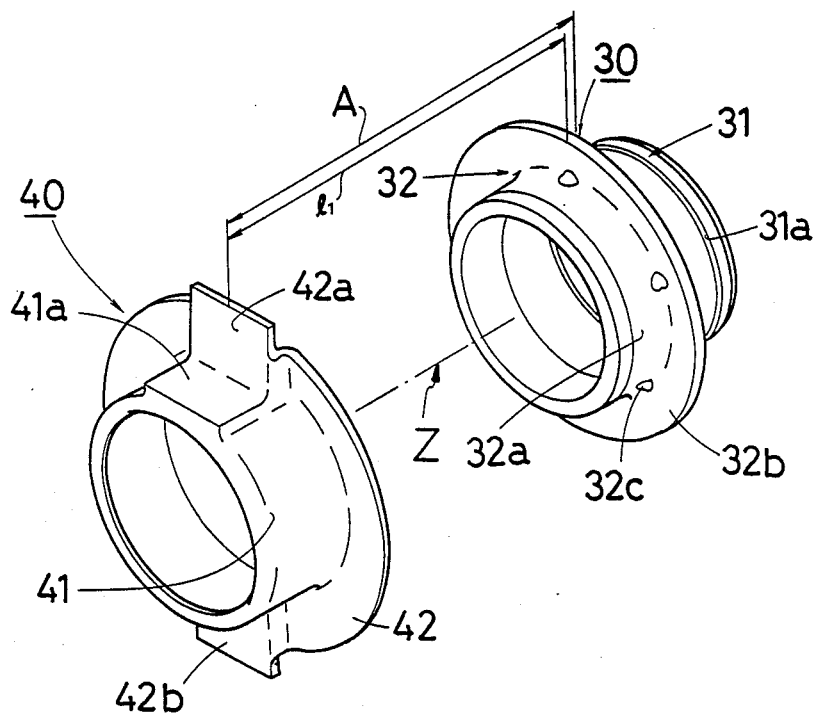
FIG. 3 is an exploded perspective view of a release hub.
Figure 4:
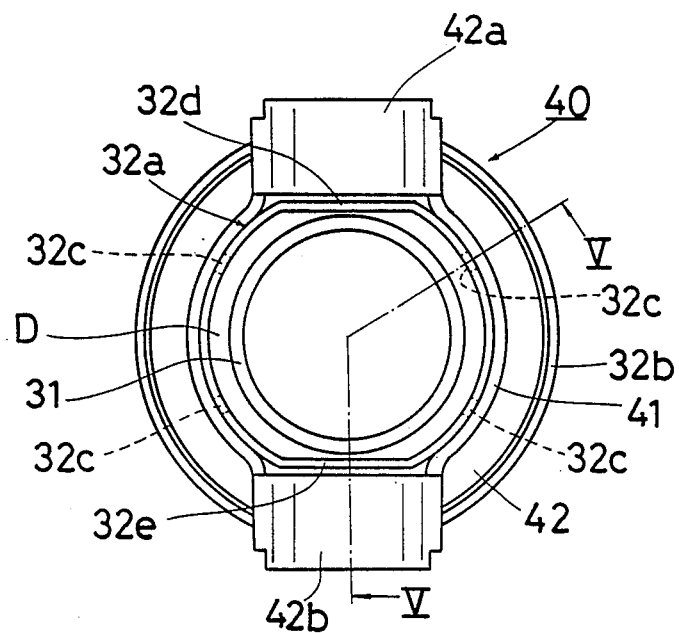
FIG. 4 is a front view of another release bearing unit according to a second preferred embodiment of the present invention.
Figure 5:
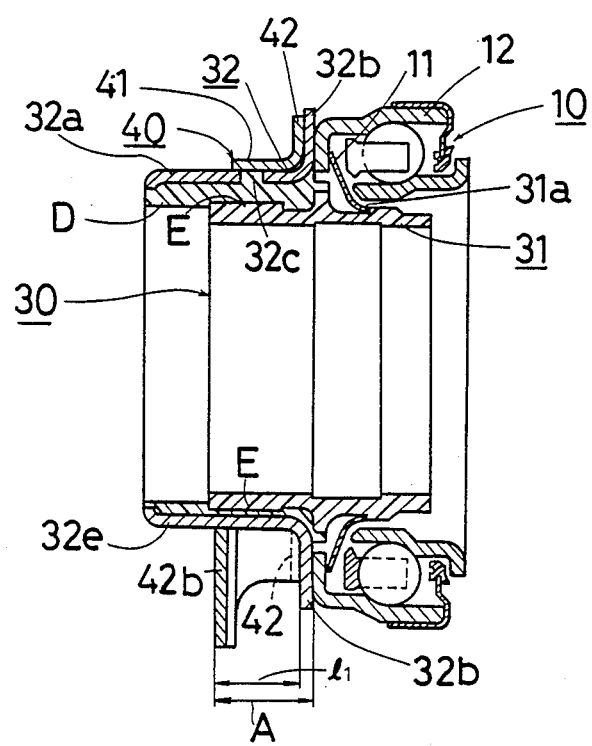
FIG. 5 is a sectional view of FIG. 4 taken along line V—V.
Figure 6:
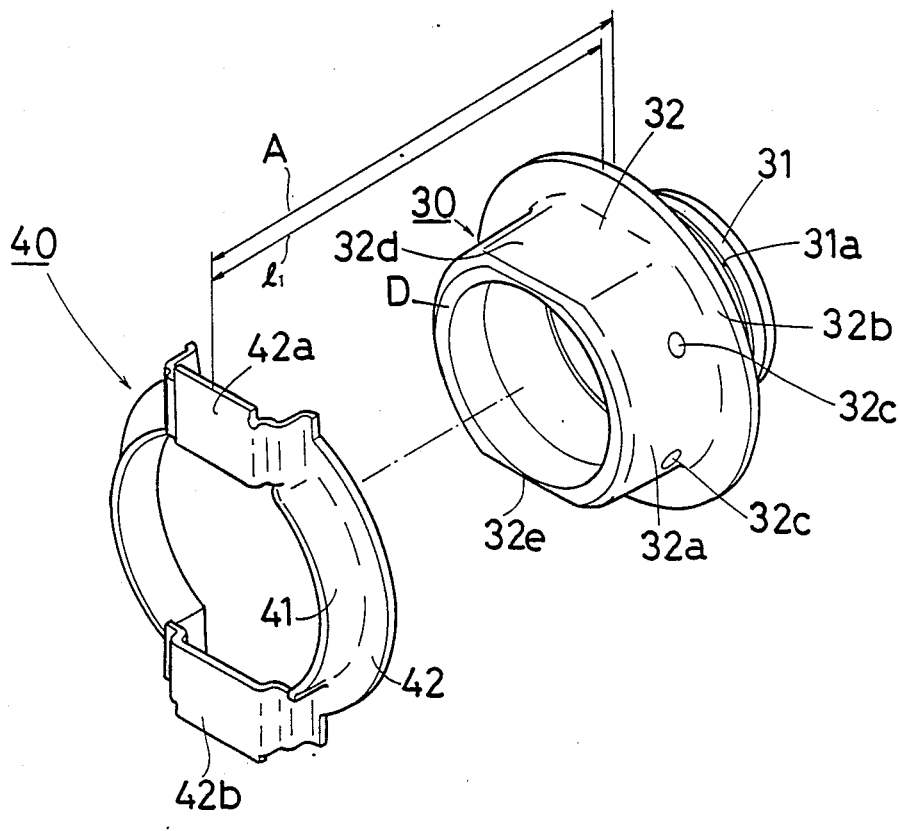
FIG. 6 is an exploded perspective view of another release hub.

FIGS. 1 through 3 show a first preferred embodiment of the present invention. A release bearing 10 and release hub 20 are illustrated. The release hub 20 comprises a hub body 30 and a fork receiving member 40. The fork receiving member 40 cannot rotate against the hub body 30 and is coupled with the outside of the hub body 30 while the fork receiving member 40 can move along axis z (indicated in FIG. 3). The hub body 30 is provided with a cylindrical sleeve 31 positioned around axis z and made of synthetic resin (ex. reinforced nylon 6.6. The hub body 30 is also provided with a bearing support member 32. The bearing support member 32 is inserted onto the outer periphery of the cylindrical sleeve 31.

The bearing support member 32 is provided with a cylindrical portion 32a for strengthing a side of the cylindrical sleeve 31 and a circular flange 32b for supporting the release bearing 10. Some apertures 32c are formed at the circular boundary between the cylindrical portion 32a and the circular flange 32b. When the hub body 30 is finished as being inserted into the fork receiving member 40, a part of the cylindrical sleeve 31 is inserted into the apertures 32c. Therefore, the bearing support member 32 and the cylindrical sleeve 31 cannot rotate against each other and cannot move axially with a part of the cylindrical sleeve 31 covering an edge axially of the cylindrical portion 32a.

Since the apertures 32c are positioned at the circular boundary between the cylindrical portion 32a and the circular flange 32b, a reduction in curvature at the cylindrical portion 32 is avoided, namely, a reduction in precision at the inner sliding face of the sleeve 31 can be effectively prevented. At the circumference of a side of the cylindrical sleeve 31, the release bearing 10 is fitted to a side of the circular flange 32b of the bearing support member 32. A spring 11 is arranged at a groove 31a of the sleeve 31 for forcing an outer ring 12 of the release bearing 10 toward the bearing support member 32. At the other end of the cylindrical sleeve 31 adjacent the cylindrical member 32a of the bearing support member 32, the fork receiving member 40 covers the cylindrical sleeve 31.

As shown in FIG. 3, the fork receiving member 40 is provided with a cylindrical portion 41 and a circular flange portion 42. The cylindrical portion 41 includes a pair of generally parallel portions 41a and 41b while the circular flange portion 42 includes a pair of vertically protruding projection portions 42a and 42b. The pair of projection portions 42a and 42b correspond to the pair of flat portions 41a and 41b, respectively. A release fork (not shown) of a clutch is coupled to the fork receiving member 40. As described above with reference to the conventional release bearing, depending on the types of automobiles, the length A of the release hub 20 of FIG. 2 must be altered. According to the first preferred embodiment of the present invention, the size and shape of the fork receiving member 40 is altered while the size of the hub body 30 remains unchanged, so that the clearance A of FIG. 2 can be freely selected.

More particularly, a plurality of fork receiving members 40 are provided which comprise the pair of projection portions 42a and 42b having different clearance length $l_1$ from the circular flange 32b to each other. One of the plurality of fork receiving members 40 is selectively coupled to the hub body 30. With the selective combination of the common hub body 30 and one of the plurality of fork receiving member 40, a plurality of different types of release bearing units corresponding to the types of automobiles can be readily manufactured.

SECOND PREFERRED EMBODIMENT

FIGS. 4 through 7 show a second preferred embodiment of the present invention. Like elements corresponding to those of FIGS. 1 through 3 are designated by like numerals.

The description of the second preferred embodiment is focused on the difference from the first preferred embodiment while the common description therebetween is omitted in the second preferred embodiment.

Figure 7:
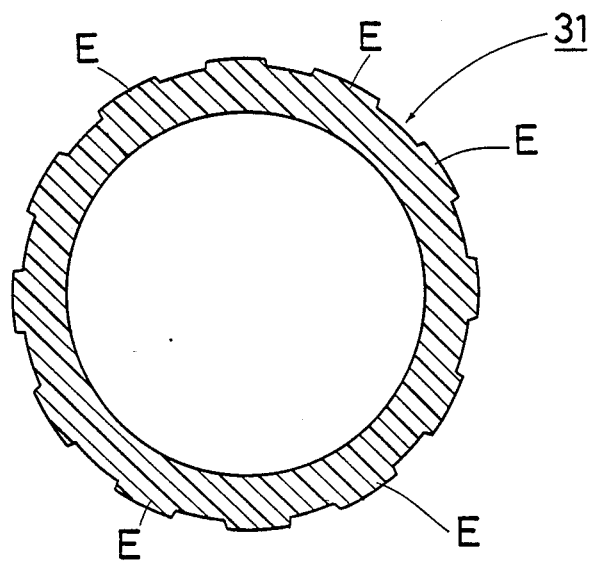
FIG. 7 is a cross-sectional view of a sleeve made of resin.
Figure 8:
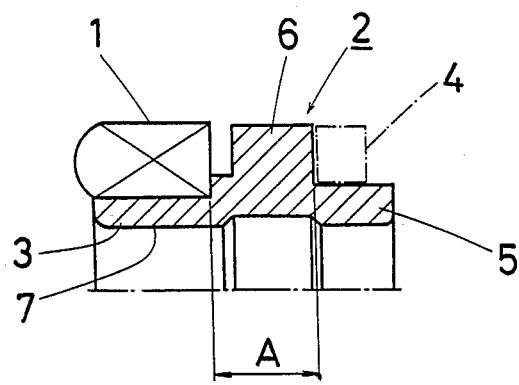
FIG. 8 is a vertical-sectional view of a conventional release bearing unit.
Figure 9:
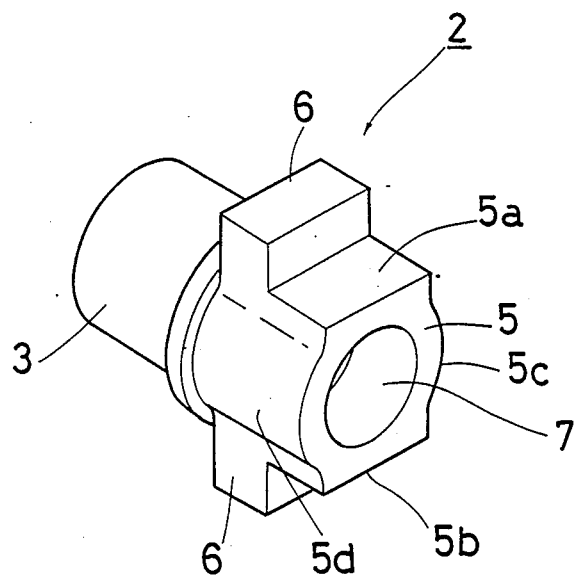
FIG. 9 is a perspective view of a conventional release hub.

Without the provision of the pair of flat portions 41a and 41b of the cylindrical portion 41 in the fork receiving member 40, the cylindrical portion 32a of the bearing support member 32 is axially extended, instead, and a pair of parallel flat portions 32d and 32e are provided in the extended cylindrical portion 32a. A release fork (not shown) is coupled to the pair of flat portions 32d and 32e. Additionally, a synthetic resin layer D is interposed between the inner face of the extended cylindrical portion 32a and the outer face of the cylindrical sleeve 31. The resin layer D is resinated together with the cylindrical sleeve 31. The resin layer D cannot rotate around the cylindrical sleeve 31 because a plurality of sawtooth projections E are provided around the circumference of the outer face of the cylindrical sleeve 31 as shown in FIG. 7.

Some apertures 32c are provided at appropriate positions of the cylindrical portion 32a of the bearing support member 32. The relative rotation of the bearing support member 32 and the resin layer D can be prevented with the resin layer D penetrating into the apertures 32c.

According to the second preferred embodiment of the present invention, in order to provide a plurality of types of release bearing units corresponding to a plurality of types of automobiles, the hub body 30 is commonly used and the shape and size of the fork receiving member 40 is solely altered. More particularly, the pair of projection portions 42a and 42b of the fork receiving member 40 have different clearance lengths $l_1$ from the circular flange 32b to each other. Therefore, to change the clearance A of FIG. 5, the pair of projection portions 42a and 42b with selective positions in the fork receiving member 40 are provided.

The resin layer D may not comprise an expensive material. In fact, it may be possible to use a waste material.

In the first and the second preferred embodiments of the present invention, the fork receiving member 40 requires a resistance to abrasion and strength because it is coupled to the release fork. For this purpose, the fork receiving member 40 is heat - treated. The bearing support member 32 does not require a resistance to abrasion and strength like the fork receiving member 40, so that the bearing support member 32 is not heat - treated. Therefore, the bearing support member 32 is not crooked nor deformed by heat - treatment. According to the present invention, the precise bearing support member 32 is commonly used and the cylindrical sleeve 31 is integrated with the bearing support member 32 with injection formation. Therefore, the inner face of the cylindrical sleeve 31 being a slide face is precisely formed.

It may be evident that other modification of the shape and material of the elements of the release bearing unit other than those described in the preferred embodiments can be considered and applied.

As described above, in accordance with the present invention, the release hub unit being combinable comprises the hub body and the fork receiving member, so that the common hub body can be combined with a selective one of the fork receiving members. As a result, the release bearing unit can easily be used in many types of automobiles. Since the sleeve made of synthetic resin shares the majority parts of the hub body, the hub body, namely, release bearing unit becomes light. Further, because the sleeve slides on the retainer made of synthetic resin, the sliding operation becomes smooth.

While only certain embodiments of the present invention have been described, it will be apparent to those skilled in the art that various changes and modifications may be made therein without departing from the spirit and scope of the invention as claimed.

What is claimed:

1. A release bearing unit comprising:
   a release bearing; and
   release hub means for receiving a release fork of a clutch, said release bearing being coupled to the circumference of said release hub means, said release hub means further comprising;
   a hub body having a generally cylindrical sleeve and a bearing support member, said generally cylindrical sleeve having a longitudinal axis, said bearing support member having a cylindrical portion positioned on a side of said generally cylindrical sleeve and having a flange in contact with said release bearing, and
   fork receiving means for engaging the release fork of the clutch, said fork receiving means being positionable on said cylindrical portion of said bearing support member and thereafter being retained relative thereto for preventing rotational and axial movement between said fork receiving means and said cylindrical portion of said bearing support member, said fork receiving means additionally having at least one projection portion defining a clearance between said fork receiving means and the flange of the bearing support member when said fork receiving means is positioned on said cylindrical portion of said bearing support member.

2. The release bearing unit as recited in claim 1, wherein said generally cylindrical sleeve of said hub body is composed of synthetic resin.

3. The release bearing unit as recited in claim 2, wherein said synthetic resin is reinforced nylon 6.6.

4. The release bearing unit as recited in claim 1, wherein said fork receiving means is heat-treated while said bearing support member fails to be heat treated.

5. The release bearing unit as recited in claim 1, wherein said fork receiving means has at least one generally flat portion adjacent said at least one projection, said at least one generally flat portion extends in the direction of said longitudinal axis when said fork receiving means is positioned on the cylindrical portion of the bearing support member, said release fork being coupled to said fork receiving means.

6. The release bearing unit as recited in claim 1, wherein said bearing support member of said hub body has at least one generally flat portion extending in the direction of said longitudinal axis, said release fork being coupled to said at least one generally flat portion.

* * * * *